(12) United States Patent
Heyworth et al.

(10) Patent No.: US 8,694,479 B1
(45) Date of Patent: Apr. 8, 2014

(54) PLACING DIGITAL CONTENT IN A PERSONALIZED DATA STORE

(75) Inventors: Samuel Heyworth, Seattle, WA (US); Erich Ringewald, Belvedere, CA (US); Peter V. Commons, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 298 days.

(21) Appl. No.: 12/435,881

(22) Filed: May 5, 2009

(51) Int. Cl.
*G06F 7/00* (2006.01)
*G06F 17/30* (2006.01)

(52) U.S. Cl.
USPC ........... 707/705; 707/736; 707/758; 707/923; 707/937; 707/938; 705/310

(58) Field of Classification Search
USPC ................. 707/705, 736, 758, 923, 937, 938, 707/999.1; 705/310
See application file for complete search history.

(56) References Cited

U.S. PATENT DOCUMENTS

| 6,941,270 | B1 * | 9/2005 | Hannula | 705/76 |
| 7,152,066 | B2 * | 12/2006 | Nelson et al. | 707/999.1 |
| 7,451,236 | B2 * | 11/2008 | Savitzky et al. | 709/246 |
| 2002/0002047 | A1 * | 1/2002 | Fujiwara | 455/426 |
| 2005/0131902 | A1 * | 6/2005 | Saika | 707/10 |
| 2006/0277482 | A1 * | 12/2006 | Hoffman et al. | 715/764 |
| 2007/0089110 | A1 * | 4/2007 | Li | 717/178 |
| 2007/0094276 | A1 * | 4/2007 | Isaac | 707/100 |
| 2007/0130211 | A1 * | 6/2007 | Lee | 707/104.1 |
| 2008/0172718 | A1 * | 7/2008 | Bradley | 726/1 |
| 2010/0153831 | A1 * | 6/2010 | Beaton | 715/201 |

FOREIGN PATENT DOCUMENTS

WO  WO0239206  5/2002

OTHER PUBLICATIONS

Hep > Buying Music, 2005-2008 la la media, inc. <<http://www.lala.com/#help>> received on Nov. 24, 2008, 1 page.
Help > CDs, 2005-2008 la la media, inc. <<http://www.lala.com/#help>> received on Nov. 24, 2008, 1 page.
Help > Discovery, 2005-2008 la la media, inc. <<http://www.lala.com/#help>> received on Nov. 24, 2008, 1 page.
Help > FAQ, 2005-2008 la la media, inc. <<http://www.lala.com/#help>> received on Nov. 24, 2008, 1 page.
Help > Listening, MP3 downloads, 2005-2008 la la media, inc. <<http://www.lala.com/#help>> received on Nov. 24, 2008, 1 page.
Help > MP3 downloads, 2005-2008 la la media, inc. <<http://www.lala.com/#help>> received on Nov. 24, 2008, 1 page.
Help > Music Mover, 2005-2008 la la media, inc. <<http://www.lala.com/#help>> received on Nov. 24, 2008, 1 page.
Help > My Collection, 2005-2008 la la media, inc. <<http://www.lala.com/#help>> received on Nov. 24, 2008, 1 page.

(Continued)

*Primary Examiner* — Hares Jami
(74) *Attorney, Agent, or Firm* — Lee & Hayes, PLLC

(57) ABSTRACT

An electronic marketplace for used digital objects is disclosed. Digital objects including e-books, audio, video, computer applications, etc., may be placed in a personalized data store upon purchase from a merchant. Placement may be manual or occur automatically. A server prompt or downloader application may be used to set preferences for manual or automatic placement. Placement may be direct or indirect. Direct placement occurs upon placement of the digital object in the personalized data store directly by the merchant. Indirect placement occurs upon transfer of the digital object to an intermediate storage location, such as the user's electronic device, then placing the digital object in the personalized data store. The user, via streaming, download, or other transfer, may then access content placed in the personalized data store.

24 Claims, 10 Drawing Sheets

(56) References Cited

OTHER PUBLICATIONS

Help > Purchase Policies, 2005-2008 la la media, inc. <<http://www.lala.com/#help>> received on Nov. 24, 2008, 1 page.

Help > Web songs, 2005-2008 la la media, inc. <<http://www.lala.com/#help>> received on Nov. 24, 2008, 1 page.

How it works—It really is this simple, 2005-2008 la la media, inc. <<http://www.lala.com/#howitworks>> received on Nov. 24, 2008, 1 page.

Pandora Internet Radio—"About Pandora", <<http://www.pandora.com/corporate/>> Received on Dec. 15, 2008, 1 page.

Pandora Internet Radio—"Frequently Asked Questions", <<http://blog.pandora.com/faq/>> Received on Dec. 15, 2008, 2 pages.

Pandora Internet Radio—"Pandora Mobile", <<http://www.pandora.com/on-the-go>> Received on Dec. 15, 2008, 1 page.

Terms of Service—The Rules. 2005-2008 la la media, inc. <<http://www.lala.com/#termsofservice>> received on Nov. 24, 2008, 1 page.

\* cited by examiner

PLACING DIGITAL CONTENT IN A PERSONALIZED DATA STORE

BACKGROUND

By gaining access rights from owners, users may quickly and easily access a variety of digital objects, also known as content. These digital objects include images, electronic books ("e-books"), audio recordings, video recordings, computer applications, and other forms of information transferable over a communication network such as the internet.

As use of digital objects increases, users may wish to transfer the digital objects to a personalized data store to provide better accessibility and a safer and more secure location for storage than the user's own electronic device. However, several problems manifest when transferring a digital object. While a physical object such as a copy of a paperback book only exists in one place at a time, digital objects can be easily and inexpensively copied without loss of fidelity. Thus, easy copying and repeated sale of the same digital object is possible, potentially eliminating scarcity of the digital object. Because of this, many owners implement digital rights management to prevent such impermissible transfers. Furthermore, the digital object as originally transferred to the initial purchaser may have license restrictions or other limitations on permissible use or further transfer. For example, a license to use a free download of a popular song may expire after a few days.

An environment which allows users to effectively and permissibly transfer a new or "used" digital object to a personalized data store, which maintains the scarcity of the digital object and the digital rights management of the owner, is thus desired. A "used" digital object is one to which a user has legitimately obtained access or ownership rights (hereinafter "access rights"), and to which the user may permissibly transfer to another user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
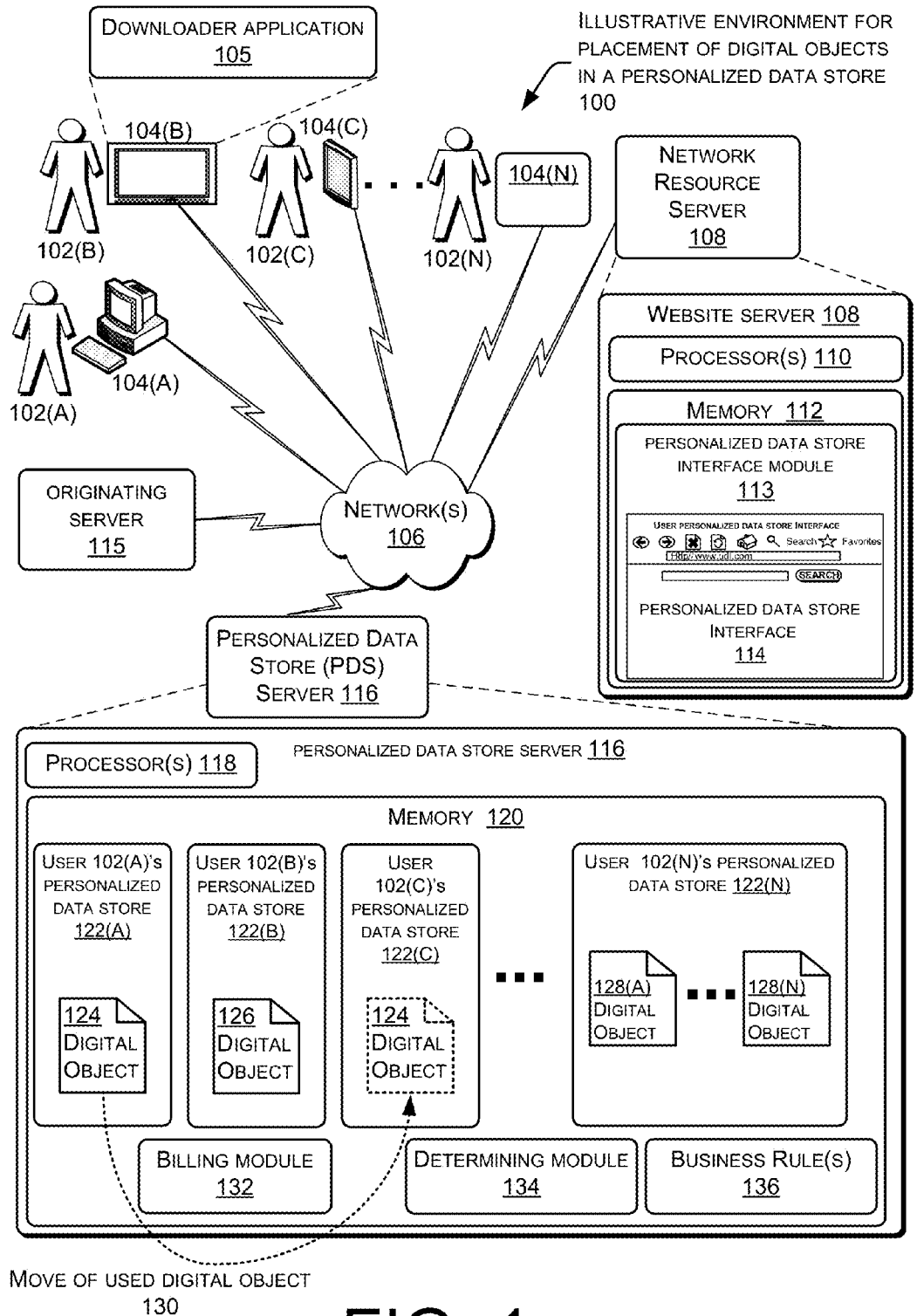
FIG. 1 is a schematic diagram of an illustrative environment for implementing a method and system that enable placement of digital objects in a personalized data store.

As described above, digital objects ("objects") may include images, e-books, audio recordings, video recordings, computer applications, and any other forms of information transferable over a communication network such as the Internet. As used in this application, a used digital object is one which a user has legitimately obtained access rights to, and may permissibly transfer to another user. Transfer of used digital objects from the original purchaser to a subsequent purchaser of the used digital object may pose problems with respect to the first sale doctrine, license obligations, etc. For example, an original purchaser may have a license to use the digital object which is non-transferable to a subsequent purchaser.

This disclosure describes an electronic marketplace ("marketplace") system enabling users to place digital objects in a personalized data store. Placement of a digital object in a personalized data store may include a transfer of a digital object into the personalized data store (e.g., by a merchant selling the digital object, by a user associated with the personalized data store, by a user unrelated to the personalized data store, etc.). Once placed in the personalized data store, a user may permissibly transfer the used digital object and/or the rights to use the used digital object to other users via the marketplace. A personalized data store may also be known as a digital locker and may be implemented as a non-resident, user-specific storage location of digital objects accessible by one or more devices at one or more locations through one or more networks. Accordingly, the personalized data store may be maintained in remote storage (e.g., a remote database, a network based storage resource such as a cloud storage service, etc.). A permissible transfer of digital objects includes a conveyance of access rights associated with a digital object which is made in accordance with policies enforced in the marketplace, and may include digital object licensing conditions, legal requirements of the country or jurisdiction to which the marketplace is subject, etc. Each user may access his or her personalized data store, and the digital objects stored within it. In some implementations, users may be allowed at least limited access to personalized data stores of other users to, for example, place a digital object or cause a digital object to be placed in the personalized data store of the other user (e.g., as a gift, loan, etc.).

A user may choose to place a digital object into a personalized data store in several different ways. For example, an originating server or a downloader application may be pre-configured to automatically place a digital object into a personalized data store. Another implementation prompts a user during setup of a user account on the originating server or during installation of the downloader application on an electronic device as to whether future placement of digital objects to a personalized data store should take place without additional prompting. In another implementation a user is prompted during each transfer of an individual digital object to determine whether to place the digital object into the personalized data store.

Placement of a digital object into a personalized data store may be direct or indirect. Direct placement transfers the digital object directly from an originating server, such as a merchant, to the personalized data store server. Indirect placement transfers the digital object to an intermediate device, such as a user's electronic device, and then transfers from the intermediate device to the personalized data store server. In some implementations, a downloader application on the user's electronic device may further facilitate direct and/or indirect placement by providing user prompts or storing user preferences for placement. An originating server interface of the marketplace may also receive user placement preferences. These user placement preferences may include, for example, whether to place digital objects into a personalized data store, and whether to use direct or indirect placement.

In various different implementations, digital objects in a user's personalized data store may be streamed to the user's local computing device, downloaded to the user's local computing device, transferred to another personalized data store, or otherwise accessed by a user through a personalized data store interface via one or more devices at one or more locations via one or more networks. As used herein, the term "transfer" refers to any type of conveyance of digital objects or portions thereof from one storage location or computing device to another. "Downloading," "streaming," and "moving" are three specific types of transfers. Permissible transfers include permissible moves, permissible downloads, permissible streaming, etc. As used herein, the terms "download" and "downloading" refer to transfer of a digital object from one storage location or computing device to another storage location or computing device, combined with storage of the digital object at the receiving storage location or computing device. The terms "stream" and "streaming" refer to transfer of a digital object from one storage location or computing device to another storage location or computing device, without maintaining the digital object at the receiving storage location or computing device after conclusion of the streaming. Thus, downloading results in a copy of the used digital object being fixed (at least temporarily) in memory of the receiving storage location or computing device, whereas streaming is transitory in nature such that the used digital object is present in memory of the receiving storage location or computing device only substantially contemporaneously with the act of streaming.

The terms "move" and "moving" refer to transfer of a digital object from one storage location or computing device to another storage location or computing device, combined with storage of the digital object at the receiving storage location or computing device and deletion of the digital object from the sending storage location or computing device. One example of a move is a move of a digital object between personalized data stores. In some implementations, used digital objects may remain freely movable between personalized data stores until the occurrence of certain events, at which point moves between personalized data stores are no longer permitted.

Thresholds may be set which limit transfer of a used digital object after the occurrence of certain events. For example, a threshold may limit how many times a used digital object may be permissibly moved to another personalized data store, how many downloads (if any) may occur before transfer is restricted, etc. These thresholds help to maintain scarcity of digital objects in the marketplace and/or to comply with licensing requirements of the digital object, by putting conditions on when and how many times used digital objects may be transferred. These limits may be set for a specific digital object, a digital object type (such as a particular title of book), a digital object category (such as all movies), etc. In some cases, a user with limited rights to move or download a used digital object may still have access to the used digital object stored in the personalized data store. For example, a user unable to move the used digital object between personalized data stores or download the used digital object, may continue to access the used digital object in his or her personalized data store via streaming, via the personalized data store interface, etc. Alternatively, a user's ability to access the used digital object by streaming may also be limited upon the occurrence of certain events.

In one example, a user may use the personalized data store interface to access and manage used digital objects within his or her personalized data store. A user may move available used digital objects to personalized data stores of other users, maintain a list of wanted used digital objects (for example, songs the user would like to have moved to his or her personalized data store), maintain a list of used digital objects which are available for movement (for example, songs the user no longer wants to be able to access), etc. The movement of the available used digital object to another user's personalized data store may be a result of a sale, rental, loan, gift, trade, etc.

Users may also use their personalized data store interface to list or otherwise seek to obtain a wanted collection of digital objects. A collection of digital objects includes two or more digital objects. For example, a collection of digital objects may be all songs found on a particular album, or all episodes of a particular television show from a particular season. When a user seeks a collection of digital objects, a search of used digital objects available for movement in other personalized data stores takes place. Once used digital objects are located, the collection is built and the collection may then be moved to the personalized data store of the requesting user. Note that in some instances, the collection may be built from used digital objects owned by multiple different users.

Illustrative Environment for a Used Digital Objects Marketplace

FIG. 1 is a schematic diagram of an illustrative environment 100 for implementing a method and system that enable placement of digital objects in a personalized data store. The environment 100 also enables permissible transfer of used digital objects among different users, thus creating a marketplace for used digital objects. In environment 100, many users 102(A), 102(B), to 102(N) may use an electronic device 104(A), 104(B), to 104(N) to access a network 106 and establish communication with a server 108 implementing a network resource, e.g., a website. As used in this application, "N" is any integer number greater than zero.

Network 106 may be any type of communication network, including the Internet, a local area network, a wide area network, a wireless wide area network, a cable television network, a wireless network, a telephone network, etc. Network 106 allows communicative coupling between electronic devices 104 and servers, such as network resource server 108.

Electronic devices 104 may include a personal computer 104(A), an entertainment system 104(B), a personal digital assistant (PDA) 104(C), or other computing device 104(N) that is capable of communicating over a network, including but not limited to, set-top boxes, mobile phones, digital media players, tablets, laptop computers, desktop computers, electronic book readers, game consoles, servers, etc. Electronic devices 104 may also have a downloader application 105 stored in memory thereof. Downloader application 105, as described below, may facilitate placement and transfer of digital objects within the environment 100. Downloader application 105 may also incorporate other functionality, such as the ability to present the digital objects to the user.

Network resource server 108 may be either a single server or a larger collection of servers, such as a data center or multiple data centers. Network resource server 108 may include one or more processors 110 and a memory 112, the memory comprising one or more computer-readable storage media (CRSM). The CRSM may include, but is not limited to, random access memory (RAM), read-only memory (ROM), electrically erasable programmable read-only memory (EE-PROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a processor. The processor 110 is configured to execute instructions stored in the memory 112. For example, a personalized data store interface module 113 may be stored in memory 112 and executed by the processor 110 to provide a personalized data store interface 114 to a user.

Originating server 115 may be either a single server or a larger collection of servers, such as a data center or multiple data centers. Originating server 115 may include one or more processors and a memory, the memory comprising one or more computer-readable storage media (CRSM). Originating server 115 provides a storefront on network 106 for a user 102 to purchase or otherwise legitimately obtain rights to permissibly transfer a digital object. The originating server 115 is just one example of an originating server or source of legitimately obtained digital objects that is useable to implement the techniques described herein. Other originating servers may also be used, such as servers maintained by authors, publishers, artists, producers, distributors, brokers, or other sources of digital objects that have and can convey legitimately obtained access rights.

Personalized data store server 116 may be accessed using personalized data store interface 114, which provides access functionality to users 102. Network 106 connects personalized data store server 116 and network resource server 108. The personalized data store server 116 may be located on the same or a separate server as the network resource server 108 and may also include either a single server, or a larger collection of servers, such as a data center or multiple data centers. Personalized data store server 116 may include one or more processors 118 and a memory 120, the memory including one or more computer-readable storage media (CRSM). Processor 118 is configured to execute instructions stored in the memory 120.

In one embodiment, stored within memory 120 is a plurality of personalized data stores 122(A), 122(B), 122(C), to 122(N), each associated with a user account. As shown in the illustrated example, user 102(A) has personalized data store 122(A) which stores used digital object 124. User 102(B) has personalized data store 122(B) which stores used digital object 126. User 102(C) has personalized data store 122(C) which is initially empty. User 102(N) has personalized data store 122(N), which may store used digital objects 128(A) to 128(N). That is, a user may store as many digital objects as his or her personalized data store can hold, such as up to a pre-determined storage limit defined in size in bytes, a number of files, etc. This storage limit may be fixed or may be variable (e.g., with time, with payment of additional fees, etc.). When multiple users hold the same access rights from an owner for the same digital object (for example, many people may have rights to view the movie "Blade Runner"), a separate copy of the used digital object may be stored in each individual personalized data store, or the personalized data store may contain a reference or pointer to a centralized copy. While the personalized data stores 122(A) through 122(N) are shown stored in memory 120, in other examples, the personalized data stores 122(A) through 122(N) may be stored in different memories residing on the same or different servers or in remote data storage accessible by the digital locker server 116.

A user may stream, download, or otherwise access a used digital object stored in his or her personalized data store. Used digital objects may also be moved from one personalized data store to another for a variety of reasons, when the move is permissible. For example, a user may permissibly move a used digital object from one of his personalized data stores to another of his personalized data stores. In another example, a user may permissibly move a digital object to a personalized data store of another user of the electronic marketplace. In the illustrated example, a used digital object 124 may be permissibly moved 130 from user 102(A)'s personalized data store 122(A) to user 102(C)'s personalized data store 122(C). Once permissibly moved, used digital object 124 is no longer in user 102(A)'s personalized data store 122(A) and now resides only in user 102(C)'s personalized data store 122(C). In some embodiments, a billing module 132 may be configured to levy a fee upon transfer (e.g., movement, download, and/or streaming) of a used digital object. A determining module 134 may be configured to determine whether to permit or deny transfer of the used digital object according to one or more business rules 136.

Figure 2:
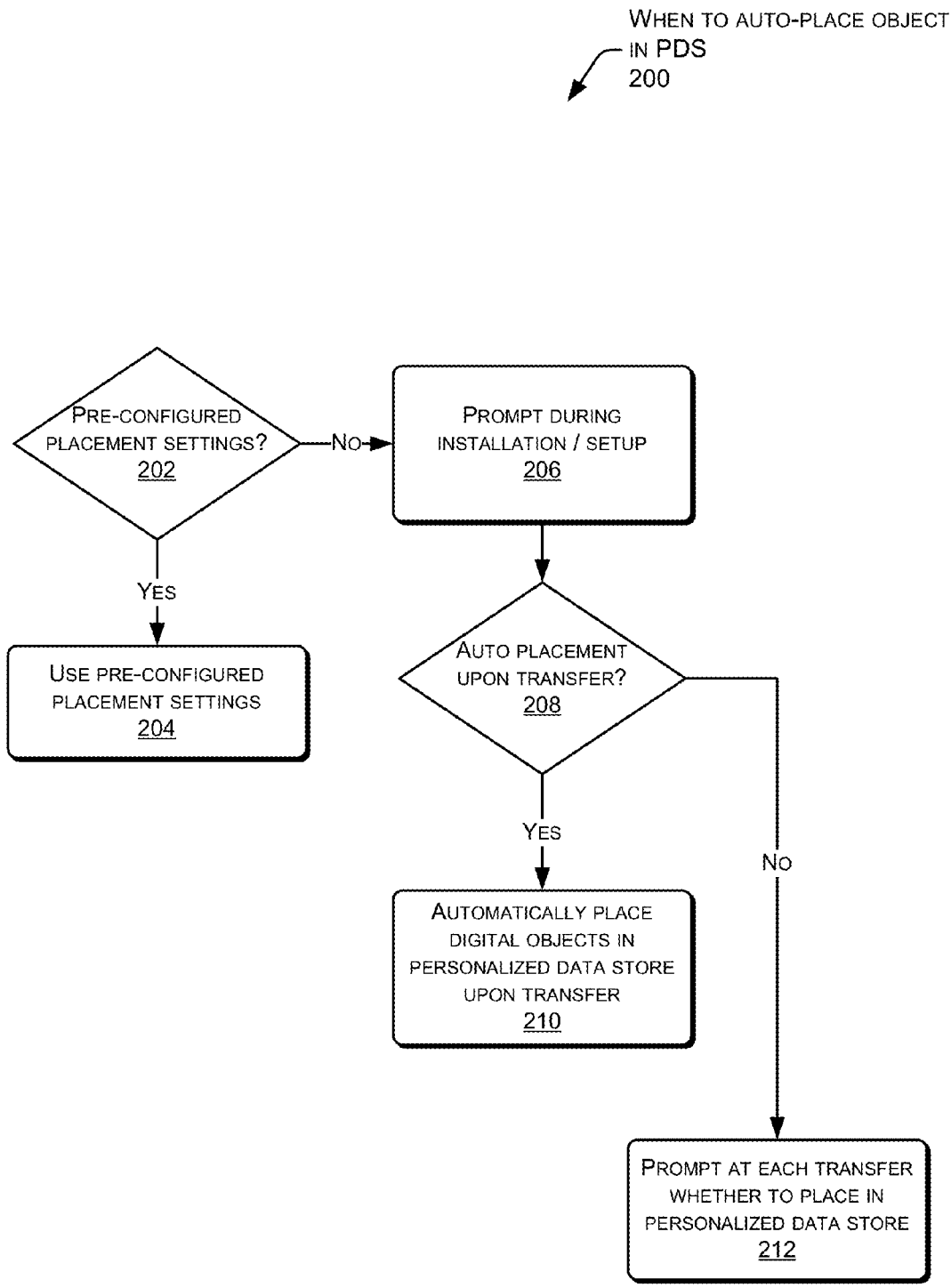
FIG. 2 is a flow diagram of an illustrative method of automatically placing a digital object in a personalized data store.

FIG. 2 is a flow diagram of an illustrative method 200 of automatically placing a digital object in a personalized data store that may, but need not, be implemented using the architecture shown in FIG. 1. The method 200 will be described in the context of the architecture of FIG. 1 for convenience and clarity. This illustrative method may occur either on an originating server 115, on a downloader application 105 installed on the electronic device 104 of the user, or via a combination of these two.

Incorporating a user's preferences as to when to place a digital object within a personalized data store improves usability. For example, one user may choose to have every digital object which is purchased stored automatically within a personalized data store while another user prefers a prompt with each separate purchase. These preferences thus impact the actions of downloader application 105 or originating server 115.

At 202, the method determines if preconfigured placement settings are available specifying whether and under what circumstances digital objects are to be placed in a personalized data store. The preconfigured placement settings may also specify the process by which digital objects are to be placed in the personalized data store (e.g., with or without prompting). At 204, the preconfigured settings are interpreted by the downloader application or merchant server.

When no preconfigured settings are available at 202, at 206 a prompt may be presented to a user, for example, during installation or setup. This prompt may be to a user installing a server application, installing a downloader application, and/or setting up an account at the originating server. At 208, user input is received requesting automatic placement of digital objects within the personalized data store. When the user 102 selects automatic placement at 208, at 210 the server application, downloader application, and/or user account stores this selection and, for subsequent transfers, will automatically place the digital object within the personalized data store without further prompts to the user 102. A user may also subsequently change these settings, to reflect changing preferences.

When automatic placement upon transfer at 208 is not selected, at 212 the server application, downloader application, and/or user account stores this selection and, for subsequent transfers, will prompt the user as to whether to place the digital object within the personalized data store. Additionally, the prompts may also include what placement method to use. Details of several example placement methods are described next.

Figure 3:
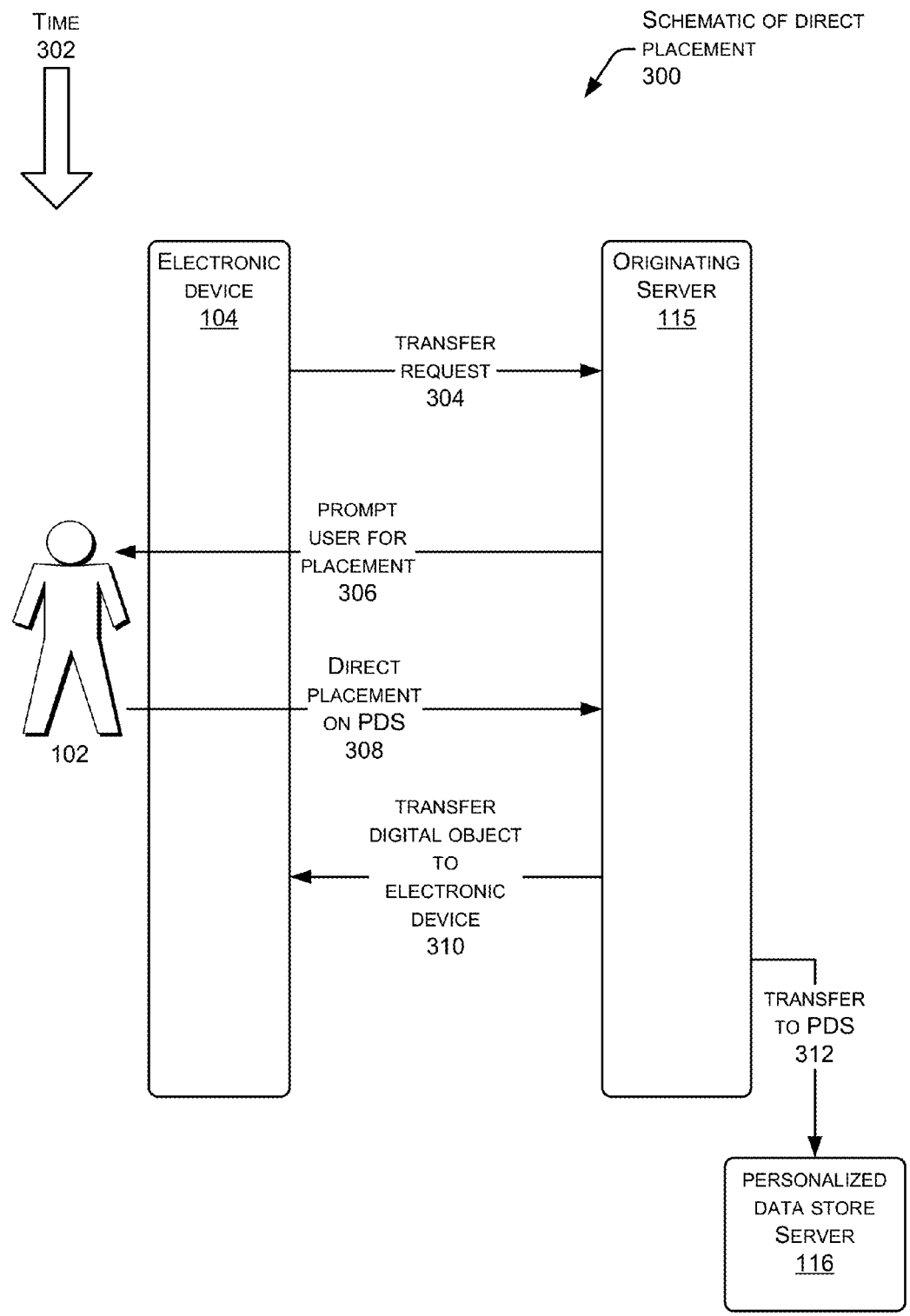
FIG. 3 is a schematic diagram of an illustrative message flow for direct placement of a digital object into a personalized data store.

A user may choose to place a digital object into the personalized data store via several different methods including direct and indirect placement, described next. FIG. 3 is a schematic diagram of an illustrative message flow 300 for direct placement of the digital object into the personalized data store. In this schematic, time increases in the direction of arrow 302, towards the bottom of the figure.

A transfer request 304 for a digital object is issued from electronic device 104 to originating server 115. This transfer request may be generated automatically or as the result of a user's input. A prompt 306 from originating server 115 to electronic device 104 is issued asking whether to place the digital object to be transferred into the personalized data store 116. The prompt 306 may prompt the user to place the digital object in the personalized data store in addition to or instead of transferring the digital object to the user's local electronic device 104. In another implementation, the prompt may be generated by downloader application 105 resident on electronic device 104. In either case, the electronic device 104 issues a direction 308 to originating server 115 to place the digital object in the personalized data store.

Upon receiving the direction, originating server 115 may transfer 310 the requested digital object to electronic device 104. The originating server 115 may also transfer 312 the requested digital object to personalized data store 116 at substantially the same time, or at a later time. Thus the digital object is placed into the personalized data store directly from the originating server 115. In some implementations, transfer 312 may be subject to placement business rules. For example, these placement business rules may be present on originating server 115 and include, for example, permissions defining whether and how a digital object may be placed in a personalized data store. In one implementation, the business rules may specify that some digital objects may not be permitted to be placed in a personalized data store.

Figure 4:
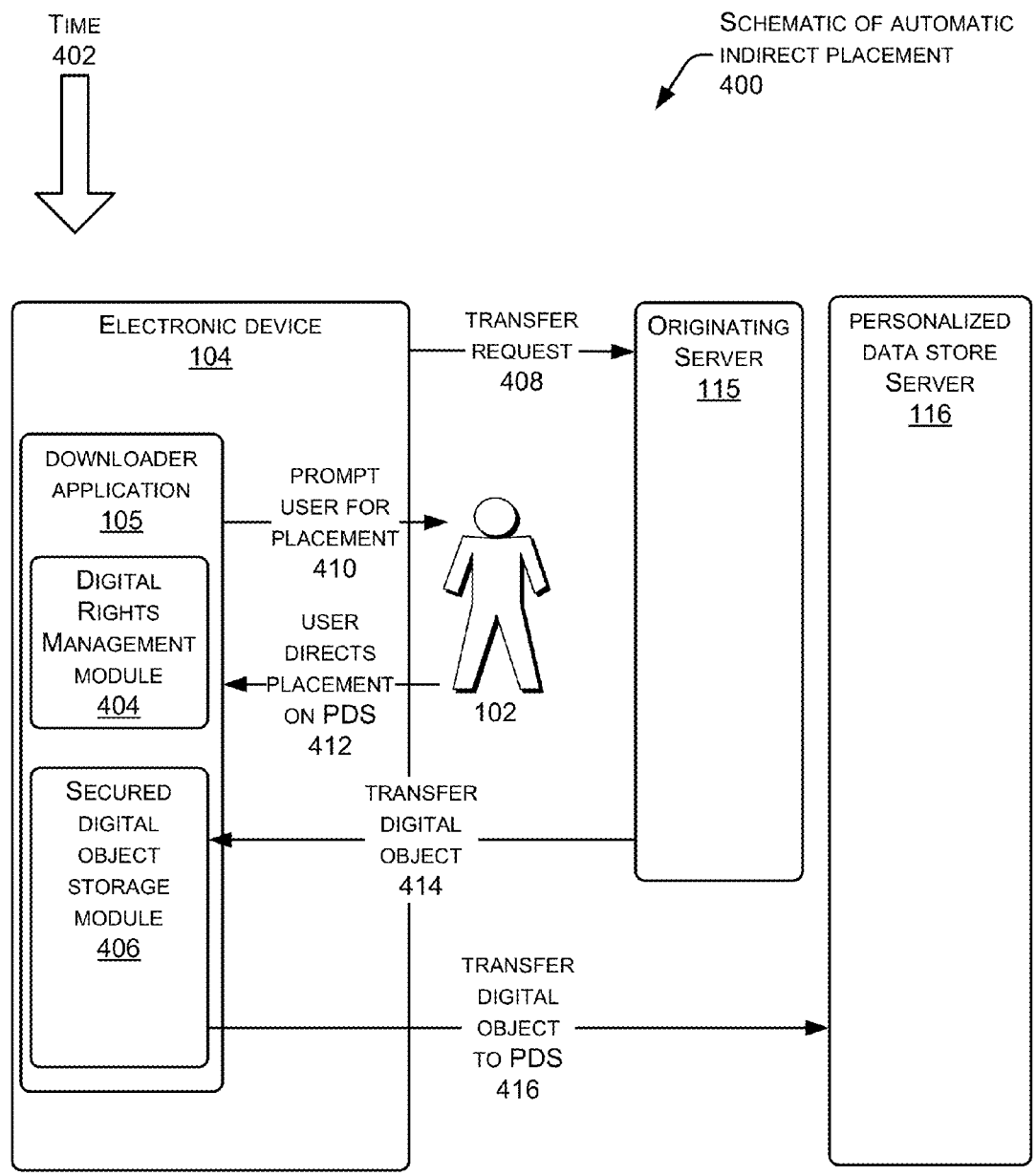
FIG. 4 is a schematic diagram of an illustrative message flow for indirect placement of a digital object into a personalized data store.

Another method for placement of the digital object into the personalized data store is indirect placement. FIG. 4 is a schematic diagram of an illustrative message flow for indirect placement 400 of a digital object into a personalized data store. As above, in this schematic time increases in the direction of arrow 402, towards the bottom of the figure.

Electronic device 104 is shown with downloader application 105. Downloader application 105 may be stored in CRSM and executed on a processor of electronic device 104. In some implementations, downloader application 105 may include a digital rights management module 404 and a secured digital object storage module 406. Digital rights management module 404 may enforce digital rights for digital objects on the electronic device. Secured digital object storage module 406 may receive and securely store digital objects to prevent illegitimate transfers. In one implementation, secure storage may include encryption of the digital object, such that only a particular electronic device may decrypt the digital object.

A transfer request 408 for a digital object is issued from electronic device 104 to originating server 115. This transfer request may be generated automatically or as the result of a user 102's input. When the user 102 has selected to be prompted, as describe above with respect to FIG. 2, downloader application 105 issues a prompt 410 to user 102 asking whether to place the digital object to be transferred into the personalized data store 116. In another implementation, the prompt may be generated by the originating server 115. An direction 412 from user 102 to downloader application 105 for placement on the personalized data store may be issued.

In this implementation, the digital object is transferred 414 to electronic device 104 using downloader application 105. In one implementation, using the secured digital object storage module 406, the digital object may be stored in the secured digital object storage module 406. In this implementation, the digital rights management module 404 may also manage user access to the digital object. Downloader application 105 then transfers 416 the stored digital object to personalized data store server 116. Thus, the downloader application 105 is configured to not only receive digital objects, but transfer them to the personalized data store. In one implementation, the transfer 416 is a move, with no copy left behind on electronic device 104. In other implementations, the downloader application may be omitted. In such an implementation, the user may take the transferred digital object and transfer the digital object to the personalized data store server 116 without the downloader application 105.

Figure 5:
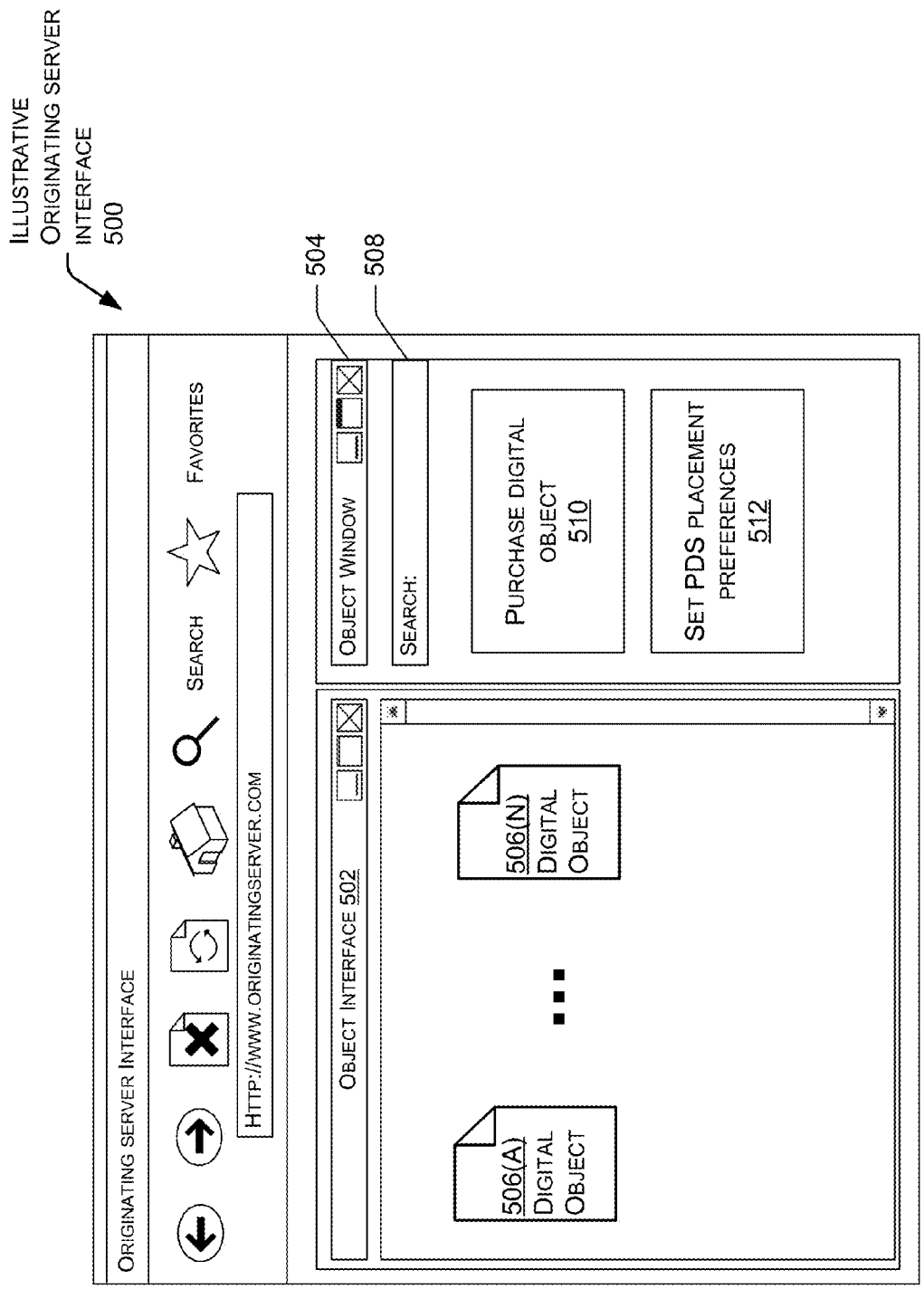
FIG. 5 is a schematic diagram of an illustrative originating server interface.

FIG. 5 is a schematic diagram of an illustrative originating server interface 500, which may be presented by originating server 115. Depicted are object interface 502 and object window 504. Within object interface 502 are presented digital objects 506(A) . . . 506(N) available for purchase.

Returning to object window 504, a search box 508 is displayed in the illustrated example. Search box 508 provides an area for a user to input information about a desired digital object. For example, a user may search to find a particular digital object to purchase. A purchase digital object control 510, to purchase an object, may also be presented. Activation of this control allows a user to initiate purchase of a digital object, for example, from the originating server, a third party, or another source.

A set PDS placement control 512 may also be provided to enable users to set personalized data store placement preferences. Activation of this control allows a user to set placement preferences defining whether and how (such as via direct or indirect transfer) to place digital objects in the user's personalized data store.

Figure 6:
FIG. 6 is a flow diagram of an illustrative method of moving a used digital object.

Once a digital object has been placed in a personalized data store, permissible transfers and moves may be made. FIG. 6 is flow diagram of an illustrative method for permissibly moving a used digital object 600 to another personalized data store. At 602, a digital object received from an authorized source is placed in a personalized data store. As described above, this may be a direct or indirect placement. This authorized source may be a publisher, a bookseller, another user with legitimately obtained rights to transfer, a merchant, or another trusted source permitted to distribute access rights to digital objects and/or digital objects themselves to users. In one embodiment, upon storage of the digital object in a user's personalized data store, an object move counter ("OMC") and an object download counter ("ODC") for the used digital object may be initialized to zero or, if the object has been previously moved or downloaded, may retain the values of the authorized source. When moving the used digital object, the OMC is incremented. The OMC may be used to implement a policy in the marketplace where digital objects may only have a finite number of moves between personalized data stores, thus producing scarcity within the marketplace. It will be appreciated that when a used digital object is downloaded to another location, particularly to a location beyond the data store server 116, the personalized data store service provided by the data store server 116 may no longer be able to control the access rights to the used digital object and impermissible transfers of the used digital object could be made. Therefore, the ODC may be used to implement a policy in the marketplace where digital objects may only be downloaded from the user's personalized data store a finite number of times, if at all, thus maintaining control over the digital object and producing scarcity both inside and outside the marketplace. For example, the ODC may be incremented when a user downloads a digital object to the user's local computing device. The ODC may also be incremented when a user downloads the digital object to a storage location outside of the marketplace.

At 604, an object move threshold ("OMT") may be set. The OMT may limit the number of transfers of a used digital object to other personalized data stores when the used digital object has been moved more than a threshold number of times, thereby helping to maintain the scarcity of the digital object in the marketplace. For example, a popular used digital object such as a song may have an OMT of three, only allowing three permissible moves of the song to other personalized data stores. After the OMT is reached, the used digital object is no longer permissibly moveable to another personalized data store.

Where multiple personalized data store servers administered by different entities are available, the OMT may change. For example when one entity offers a first personalized data store service and a second entity offers a second personalized data store service, the OMT may be set to five for moves within the first personalized data store service and one for moves to the second personalized data store service. Thus, users within the first personalized data store service may permissibly move the used digital object up to five times to other users of the first personalized data store service, but only once to a user of the second personalized data store service.

User identification information may also be used to modify the OMT. For example, the OMT may be set to allow five permissible moves between a first set of users (e.g., users located in a specified geographic area, users having a premium membership, users purchasing a premium version of the digital object, users belonging to a specified group, etc.) but only one permissible move to a second set of users (e.g., users located outside the specified geographic area, users having a basic membership, users purchasing a basic version of the digital object, users not belonging to the specified group, etc.).

At 606, an object download threshold ("ODT") may be set. As discussed above, after downloading a digital object, control over that digital object may be lost. Thus, the ODT may be used to limit the number of downloads of a digital object from a personalized data store, further maintaining the scarcity of the digital object in the marketplace. For example, a popular digital object such as a song may have an ODT of zero, thus never allowing download of the song from the personalized data store. If set to one, the ODT would permit the user to download the song once from his or her personalized data store to, e.g., his or her personal media player or to another personalized data store, but thereafter the user would lose the ability to download the song again.

The ODT may also be configured to limit the number of permissible downloads by type (i.e., model) of electronic device or identification of a specific electronic device used to consume the digital content. During download, the server 108 may acquire the type of electronic device or identification number. For example, if a media player device incorporates digital rights management to prevent duplication of digital objects, the ODT may be set to five when downloading to that particular media player device, but otherwise be set to zero. Thus, a user may permissibly download the digital object five times to the same media player device, while retaining the ability to move the digital object to other users if desired. However, after downloading just once to a different device, such as a personal computer, further downloads and/or moves are not permitted, while streaming may still be permitted.

At 608, a request for movement of a used digital object from one personalized data store to another personalized data store is received. The network resource server 108, personalized data store server 116, or another server or device acting as a proxy for the personalized data store server 116 may receive the request. At 610, when the OMT for the used digital object is exceeded, at 612 the move is denied as impermissible. After denial, at 614, presentation of other access options such as purchase or movement of another available digital object to a user may take place. For example, a user may be presented with a "new" non-used digital object available for purchase and/or a list of used digital objects available for purchase. The user may then elect to try again and either purchase a "new" digital object from an owner, merchant, etc., or attempt to acquire a "used" digital object from another personalized data store.

A move limit business rule may set the OMT 604 to limit transfers in the electronic marketplace. A download limit business rule may set the ODT 606 to limit downloads in the electronic marketplace. These business rules 136 may be stored in memory 120 and configured to execute on the processor 118. The move limit business rule and download limit business rule may operate independently or in conjunction with one another to determine whether to authorize or deny the request for movement of the used digital object. In the case of the move limit business rule, the determination may be made by the determining module 134 querying the OMC and comparing the OMC to the OMT. In the case of the download limit business rule, the determination may be made by the determining module 134 querying the ODC and comparing the ODC to the ODT.

When the OMT is not exceeded at 610, the method proceeds to 616 to determine whether the ODT is exceeded. If, at 616, the ODT is determined to have been exceeded, the move is denied 612 and the user may be presented with other licensing options 614. Because control over a digital object may be lost at the time of download, restricting a number of permissible downloads helps to maintain control over the digital object and maintain scarcity in the marketplace. While the OMT is described as being checked before the ODT, the ODT may also be checked before the OMT. In another embodiment the check of the OMT at 610 or the check of the ODT at 616 may be omitted. For example, where the move limit business rule places no limits on moves between personalized data stores but restricts moves or other transfers after a single download, only the ODT would be necessary.

When, at 616, neither the OMT nor the ODT are found to have been exceeded, the used digital object is determined to be "available" and movement to another personalized data store is permissible. Thus, at 618, movement is permitted. Accordingly, at 620, the digital object is moved from the personalized data store of the originator to the personalized data store of the recipient, and the originator no longer retains a copy within their personalized data store.

At 622, when compensation for a permissible transfer takes place, such as when an originator is selling his or her access rights to a recipient, a credit may be made to an originator account while a corresponding debit (possibly less a transfer fee described next) may be made to the recipient's credit card or other payment account. The originator and recipient accounts may be maintained as part of the personalized data store service or through third party merchants or processors. The credit or fee may be a in the form of currency, points, stored value, etc.

At 624, an entity may levy a fee for the transfer instead of, or in addition to, the compensation of 622. The fee may be levied from the originator, recipient, both, or a third party. For example, a third party which owns the digital content may choose to pay the transfer fee of digital objects to encourage distribution of previously licensed digital objects. The entity levying the fee may be the operator of the personalized data store server, owner of the digital object receiving a royalty, etc.

In another implementation, the OMC and ODC's may be set to a pre-determined maximum value at initialization, and decremented at each movement or download, respectively. Thus, instead of comparing against a threshold, movement or download is determined to be impermissible when the counter is zero. For example, if the ODC is initialized to one, upon download of the digital object the ODC is decremented to zero, indicating that downloads are no longer permissible. Furthermore, where unlimited movement is permissible until a digital object is downloaded, the OMC may be omitted and the ODC used to determine when a download or movement is impermissible. Taking the example above, if the ODC is greater than zero, moves remain permissible.

Figure 7:
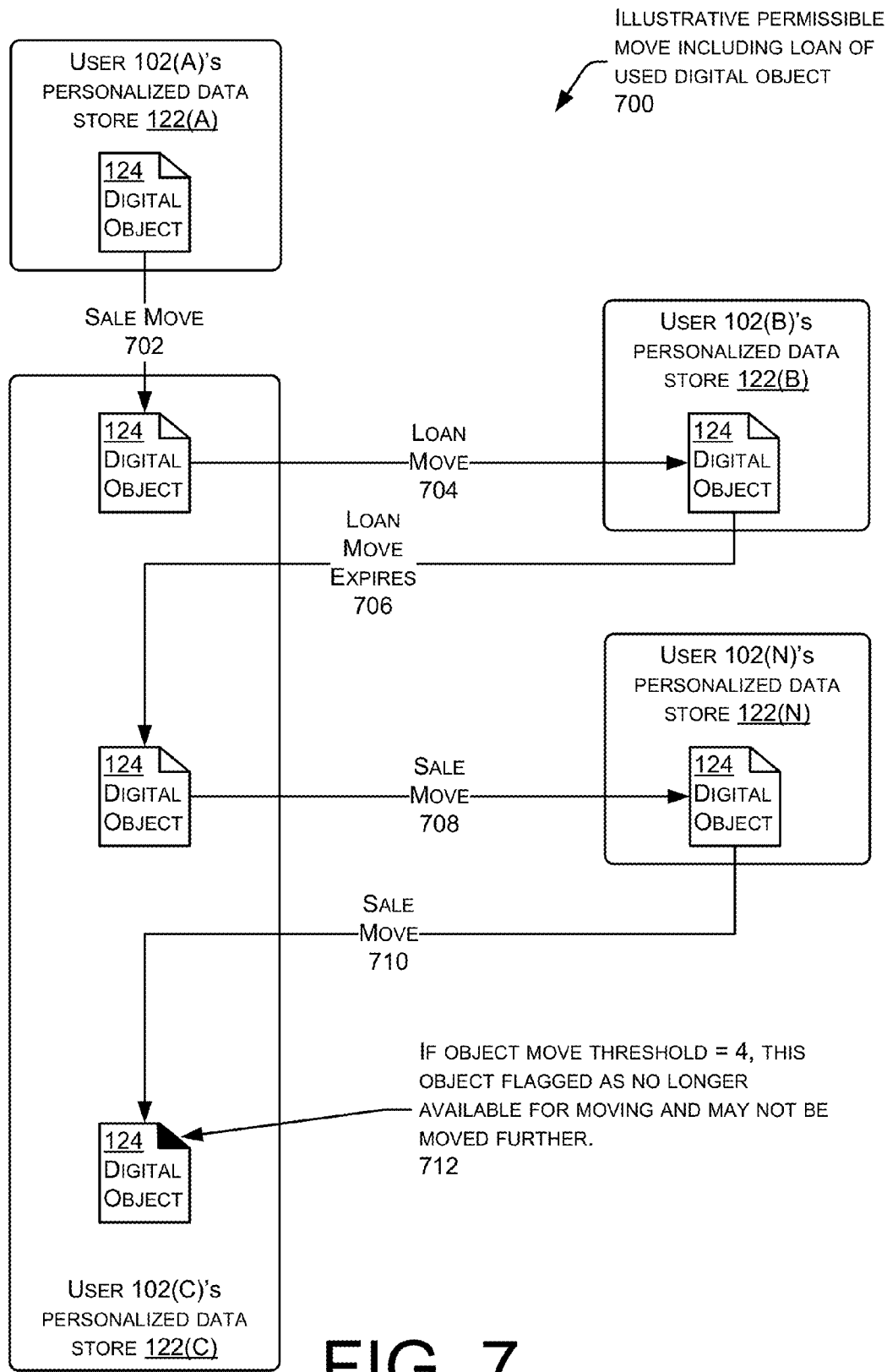
FIG. 7 is a flow diagram of an illustrative method of moving a used digital object and designating the used digital object as no longer available for further movement after exceeding a threshold number of moves.

FIG. 7 is a flow diagram of an illustrative method 700 of moving a used digital object and designating the used digital object as no longer available for further movement after exceeding a threshold number of moves. Illustrated are the personalized data stores 122(A), 122(B), 122(N), and 122(C) for users 102(A), 102(B), 102(N), and 102(C), respectively. Assume the OMT is set to four in this example.

In this illustration, digital object 124 begins in personalized data store 122(A) with user 102(A) having access rights. User 102(A) agrees to make a permissible sale move 702 of digital object 124 to user 102(C), and the OMC is incremented from zero to one. The move takes place, removing digital object 124 from personalized data store 122(A) to now reside in personalized data store 122(C).

Now suppose user 102(C) decides to loan digital object 124 to user 102(B). A permissible loan move 704 is made, the OMC is incremented from one to two, and digital object 124 is removed from personalized data store 122(C) and now resides in personalized data store 122(B). A digital object loan may be of indefinite duration, have an expiration date, or some other triggering event which terminates the loan. For example, a user may loan a digital object which is an e-book to a friend until the friend purchases her own copy of the e-book.

When the loan expires, at 706 digital object 124 is removed from personalized data store 122(B), the OMC is incremented from two to three, and digital object 124 is returned to the personalized data store 122(C) of the originating user 102(C). In another example, upon the expiration of a loan or rental, the OMC may be decremented upon return of the digital object to the personalized data store of origin.

User 102(C) then decides to make a permissible sale move 708 of digital object 124 to user 102(N). Digital object 124 is removed from personalized data store 122(C), the OMC is incremented from three to four, and now resides in personalized data store 122(N).

User 102(C) finds that she wishes to repurchase digital object 124, and makes a permissible sale move 710 of digital object 124 from user 102(N). Digital object 124 is removed from personalized data store 122(N), the OMC is incremented from four to five, and digital object 124 now resides in personalized data store 122(C).

In the illustrated example, digital object 124 is flagged as being unavailable for further movement 712 as its OMC now exceeds the OMT. As described earlier with respect to FIG. 6, when the OMC for a digital object exceeds the OMT, further moves are impermissible, and further moves requests are denied. However, while prohibiting movement to other personalized data stores, the user may continue to access digital object 124, for example via streaming or other access permitted through the personalized data store interface 114. A perceived value of the digital object may change as the OMC is increased. For example, an item with a high OMC may be considered less valuable because of its limited ability to move in the future. Or an item with a high OMC may be perceived more valuable if no longer available for direct purchase from the content owner. As described above, limits on moves, downloads, or other transfers helps enforce the rights of digital object owners or creators, and maintains scarcity in the electronic marketplace.

Figure 8:
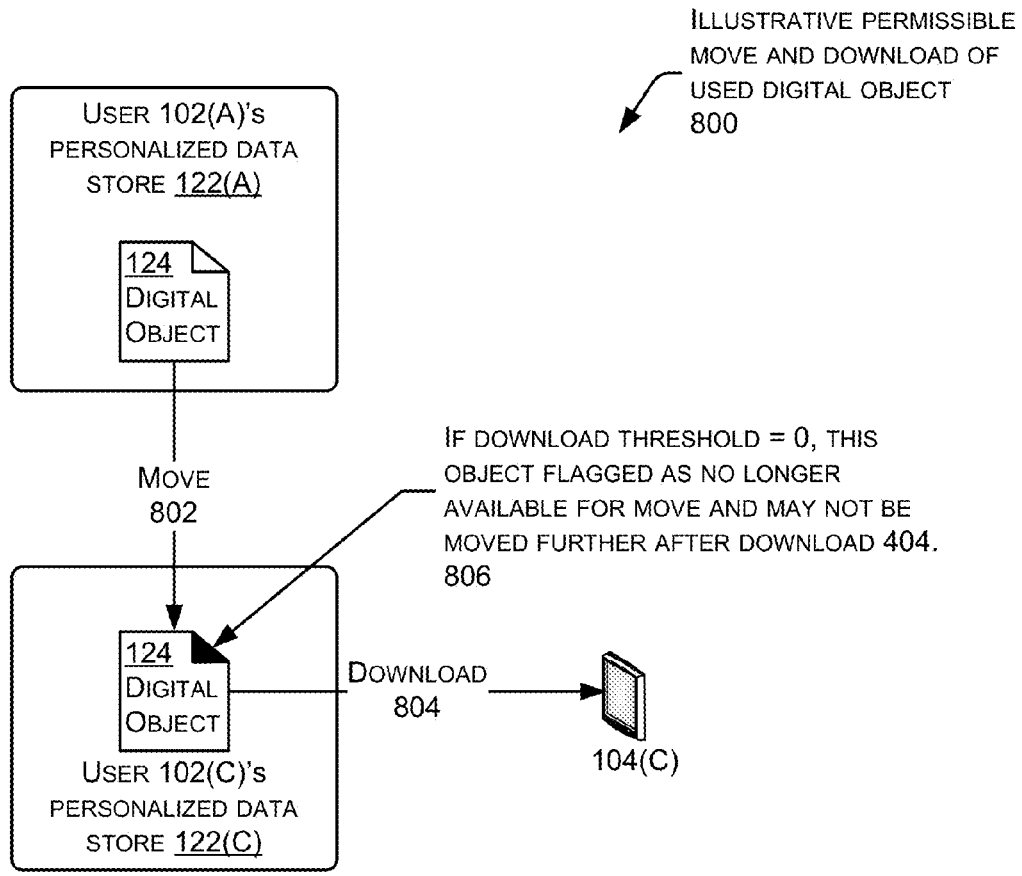
FIG. 8 is flow diagram of an illustrative method of downloading a used digital object and designating the downloaded digital object as no longer available for further movement after exceeding a threshold number of downloads.

FIG. 8 is flow diagram of an illustrative method 800 of downloading a used digital object and designating the downloaded digital object as no longer available for further movement after exceeding a threshold number of downloads.

Illustrated are personalized data stores 122(A) and 122(C) for users 102(A) and 102(C), respectively. Assume the ODT is set to zero in this illustration. Digital object 124 begins in personalized data store 122(A) with user 102(A) having access rights. User 102(A) decides to make a permissible move 802 of digital object 124 to user 102(C), and the OMC is incremented from zero to one. Digital object 124 is moved from personalized data store 122(A) to personalized data store 122(C).

User 102(C) then downloads 804 digital object 124 to PDA device 104(C), thus incrementing the ODC from zero to one, as described above. Because the ODT is set to zero further moves are impermissible and, at 806, the user may not subsequently move digital object 124 to another personalized data store. However, while prohibiting moves to other personalized data stores as described above, the user 102(C) may continue to access digital object 124 from her personalized data store 122(C), for example via streaming or other access permitted through the personalized data store interface 114.

In another example, the ODT may be set to one, while the OMT is set to an infinite value or disregarded. Thus, the digital object 124 could be moved with no limitation until the object is downloaded once, at which point further moves are impermissible.

Building a Digital Object Collection

Figure 9:
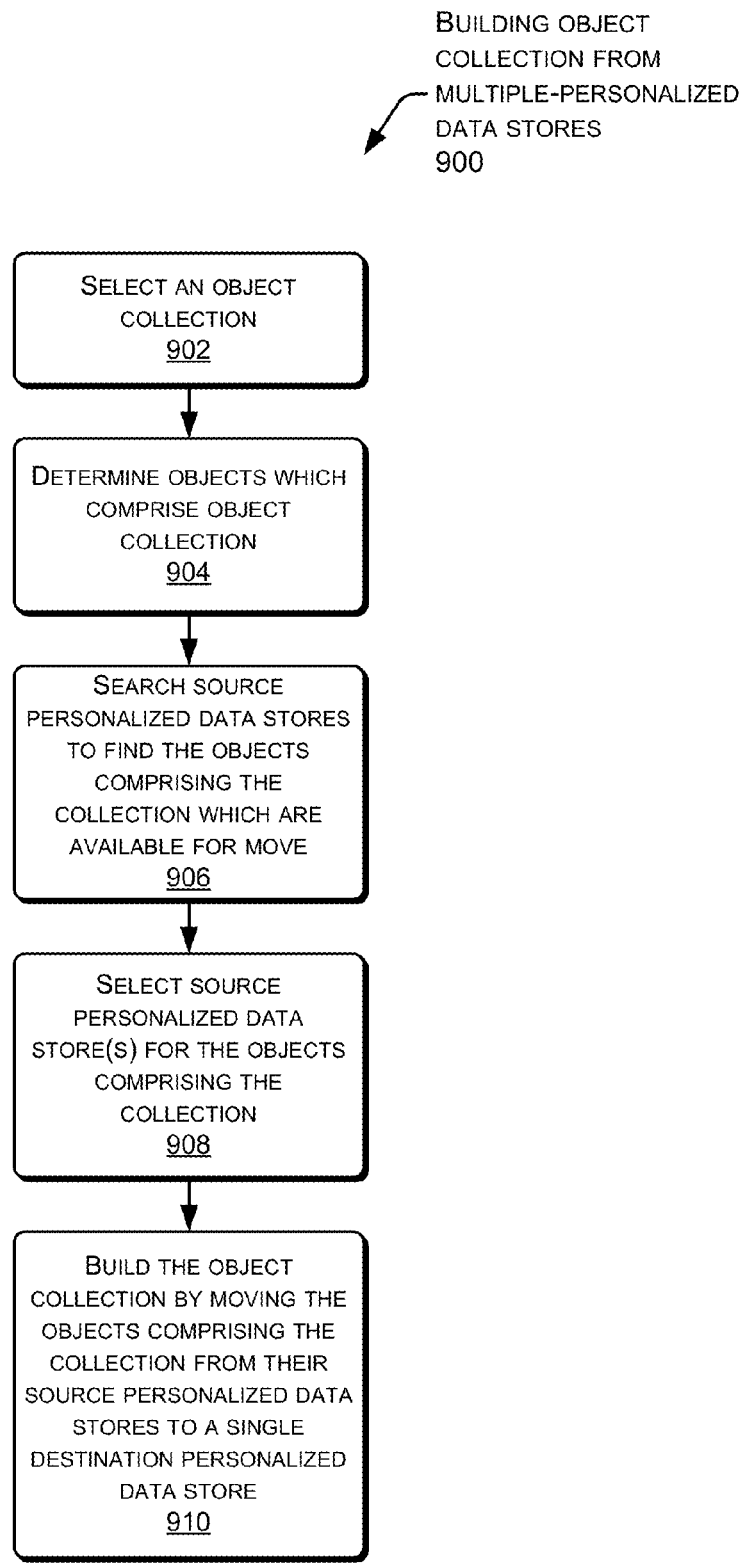
FIG. 9 is a flow diagram of an illustrative method of building a digital object collection from digital objects located in multiple personalized data stores.

FIG. 9 is a flow diagram of an illustrative method 900 of building a digital object collection from used digital objects located in multiple personalized data stores. A collection of digital objects includes two or more digital objects. For example, a collection of digital objects may be all songs found on a particular album, or all episodes of a particular television show from a particular season. Thus, while a particular album (digital object collection) may no longer be available for purchase, multiple users may hold individual songs (digital objects) which, when assembled, are equivalent to the particular album.

At 902, a digital object collection is selected. At 904, the individual digital objects forming the object collection are determined. At 906, a search of source personalized data stores is made. Source personalized data stores include personalized data stores of users which have used digital objects available for movement. As described below, users may select privacy settings on their personalized data stores to indicate whether they want their personalized data store to be available as a source personalized data store. For example, a user may opt to preclude search of her personalized data store contents entirely, permit search of digital objects in the personalized data store available for movement, or permit search of all digital objects in her personalized data store. Where a user allows searching of all digital objects, the user may be presented with an option to allow or deny a movement of a digital object from her personalized data store.

At 908, source personalized data stores for the digital objects found in the selected digital objected collection are selected. This selection may include multiple factors. For example, a user may want to have his digital object collection compiled only from the least expensive available used digital objects. Alternatively, the user may only want to compile his digital object collection from members of an affinity group, such as club, church, or social networking group.

At 910, the digital object collection is built by permissibly moving the digital objects found in the collection from their source personalized data stores to a single destination personalized data store.

Illustrative Personalized Data Store Interface

Figure 10:
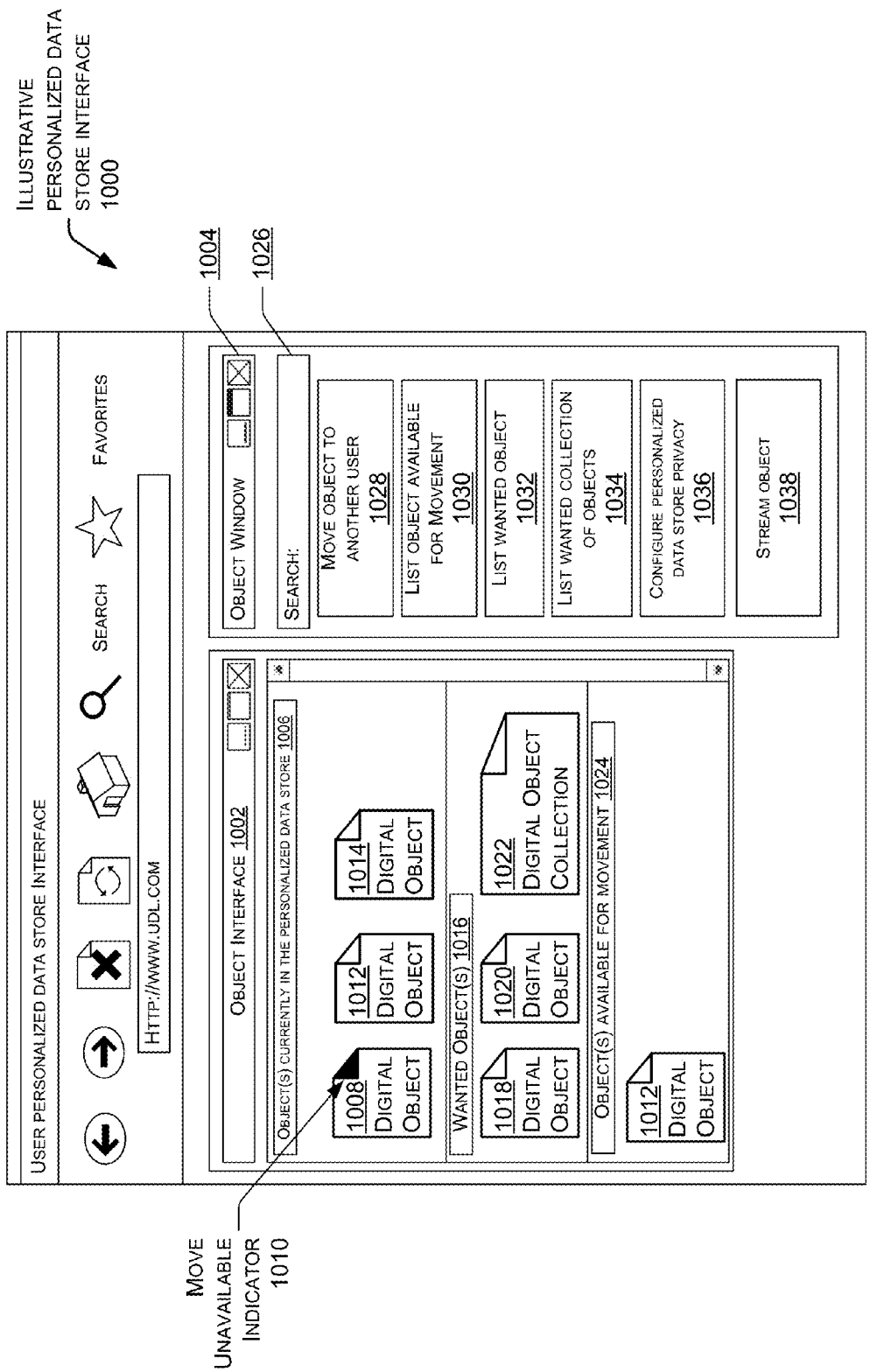
FIG. 10 is a schematic diagram of an illustrative data store interface.

FIG. 10 is a schematic diagram of an illustrative personalized data store interface 1000 presented by network resource server 108. Depicted are object interface 1002 and object window 1004. Within object interface 1002, status of digital objects ("new" and/or used) in relation to a user's personalized data store may be presented. For example, objects currently in the user's personalized data store are displayed 1006. In the illustrated example, the objects in the user's personalized data store include digital object 1008, which is denoted with a move unavailable indicator 1010, signifying that this digital object may not be moved to other personalized data stores. As described above, this may have occurred by exceeding an OMT, ODT, or both thresholds. In other embodiments this indicator may be displayed because the user has designated that digital object 1008 cannot be moved. Those skilled in the art will appreciate that other indicators may be used to designate if downloads, streaming, or other transfers are unavailable. Digital objects 1012 and 1014 are also displayed as being digital objects currently in the personalized data store in 1006, and are eligible for movement (which, in the illustrated example, is made apparent by the lack of a move unavailable indicator).

In the illustrated embodiment, wanted digital objects 1016 are also displayed and include digital object 1018, digital object 1020, and digital object collection 1022. These are digital objects to which the user wishes to acquire access rights.

Digital objects available for movement 1024 may also be presented. In the illustrated example, digital object 1012 has been designated by the user as being available for movement. For example, perhaps digital object 1012 is a song in which the user is no longer interested. In contrast, digital object 1014 is still of interest to the user, so the user has chosen not to make digital object 1014 available for movement. However should the user lose interest, digital object 1014 is not yet precluded from movement to other personalized data stores. Because the user may choose to make digital object 1014 available for movement, the move unavailable indicator 1010 is not shown. As described above, digital object 1008 is no longer eligible for movement between personalized data stores and is thus flagged with the move unavailable 1010 indicator.

Returning to object window 1004, a search box 1026 is also displayed in the illustrated example. Search box 1026 provides an area for a user to input information about a desired digital object. For example, a user may search to find a particular digital object to add to the wanted digital objects 1016 or a digital object in the user's own personalized data store.

A move control 1028 to transfer an object to another user may also be presented. Activation of this control allows a user to initiate a request for movement of a digital object as described in FIG. 6 at block 608.

An available control 1030 to identify an object as being available for movement may also be presented. Activation of this control allows a user to designate that a selected digital object is available for movement to others, for example, a used digital object for sale. When a move is unavailable, such as may be denoted with the move unavailable indicator 1010, this control may be disabled and the user may be precluded from designating the used digital object as being available for movement.

A wanted control 1032 to identify a wanted digital object may also be presented. Activation of this control allows a user indicate digital objects being sought from other users. Entry of a wanted object may also trigger a search of other users' available digital objects and presentation of a purchase interface.

As also illustrated, a wanted collection control 1034 to identify a wanted collection of objects is presented. Activation of this control allows a user indicate what collection of digital objects is being sought from others. As with control 1032, entry of a wanted collection of objects may trigger a search of other users' available digital objects and presentation of a purchase interface.

A privacy control 1036 to configure personalized data store privacy may also be presented. Activation of this control allows a user to set his or her personalized data store privacy parameters. These parameters may include user permission to allow viewing a list of personalized data store contents by other users, (and if so, whether for all users or a defined group), searching of personalized data store contents for possible movement (and whether to require confirmation of moves, or allow any moves), searching of only digital objects in the personalized data store available for movement, searching of all digital objects in their personalized data store.

A stream object control 1038 to stream an object from the personalized data store may also be presented. Activation of this control allows a user to stream contents of the personalized data store to the user. Streaming thus allows the user to access digital objects in the personalized data store wherever the personalized data store interface is accessible. In one implementation, each digital object may contain permissions which permit or deny streaming, such as denying streaming after download of the digital object.

CONCLUSION

Although specific details of illustrative methods are described with regard to the figures and other flow diagrams presented herein, certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

Conditional language, such as, among others, "can," "could," "might," or "may," unless specifically stated otherwise, or otherwise understood within the context as used, are generally intended to convey that certain embodiments include, while other embodiments do not include, certain features, elements and/or steps. Thus, such conditional language is not generally intended to imply that features, elements and/or acts are in any way required for one or more embodiments or that one or more embodiments necessarily include logic for deciding, with or without user input or prompting, whether these features, elements and/or steps are included or are to be performed in any particular embodiment.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. One or more computer-readable storage media encoded with instructions that, when executed on a processor, instruct the processor to perform acts comprising:
    receiving, at an originating server, a request to legitimately obtain a digital object;
    receiving, at the originating server, a preference to place the legitimately obtained digital object in a personalized data store comprising a user-specific storage location associated with, and remote from, a user associated with the user request, the user being able to manipulate digital objects in the user-specific storage location associated with the user; and
    transferring the digital object from the originating server to an intermediate storage location along with an instruction instructing the intermediate storage location to forward the digital object to the personalized data store located on a server different from the originating server and remote from the user, the server different from the originating server having a plurality of users and a plurality of user-specific storage locations corresponding to the plurality of users;
    wherein the intermediate storage location is an electronic device under the control or direction of the user.

2. The one or more computer-readable storage media of claim 1, further comprising receiving the user preference from a downloader application.

3. The one or more computer-readable storage media of claim 1, wherein the originating server and personalized data store are administered by different entities.

4. The one or more computer-readable storage media of claim 1, wherein the user preference comprises a preconfigured placement setting, which is set prior to receiving the user request to legitimately obtain the digital object.

5. The one or more computer-readable storage media of claim 1, further comprising:
    initiating installation of a downloader application on the intermediate storage location; and
    directing with the installed downloader application to place digital objects present on the intermediate storage location in the personalized data store.

6. One or more computer-readable storage media storing instructions that, when executed on an electronic device under the control or direction of a user, instruct a processor to perform acts comprising:
    receiving, at the electronic device under the control or direction of the user, a user preference to place at least one digital object that is subsequently obtained legitimately in a personalized data store comprising a user-specific storage location associated with, remote from, and at least remotely accessible over a wide area network by, the user;
    sending a request to legitimately obtain a specified digital object from an originating server;
    receiving, at the electronic device, the specified digital object from the originating server, the receiving including storing the received specified digital object in a secured digital object storage module such that the user cannot access the received specified digital object; and
    automatically placing, by the electronic device, the received specified digital object in the personalized data store in response to the user preference and without further instruction from the user such that the received specified digital object is removed from the secured digital object storage module, the personalized data store being one of a plurality of personalized data stores, each of the plurality of personalized data stores associated with a corresponding user of a plurality of users, the plurality of personalized data stores each comprising a user-specific storage location of the corresponding user.

7. The one or more computer-readable storage media of claim 6, wherein the user preference comprises a preconfigured placement setting, which is set prior to sending the request to legitimately obtain the digital object.

8. The one or more computer-readable storage media of claim 6, further comprising instructions to perform additional acts comprising:
    installing a downloader application on the electronic device, and
    wherein the placing comprises transferring the digital object to the personalized data store using the downloader application.

9. The one or more computer-readable storage media of claim 8, wherein the downloader application comprises a digital rights management module configured to enforce digital rights of the digital object on the electronic device and the secured digital object storage module is configured to store the digital object on the electronic device.

10. The one or more computer-readable storage media of claim 9, wherein the secured digital object storage module is configured to encrypt the digital object and allow decryption on the electronic device.

11. The one or more computer-readable storage media of claim 8, further comprising instructions to perform additional acts comprising:
    sending a request to the personalized data store to stream the digital object from the personalized data store to the electronic device as long as the user retains access rights to the digital object; and
    presenting the digital object streamed from the personalized data store.

12. The one or more computer-readable storage media of claim 6, further comprising instructions to perform additional acts comprising:
    enforcing digital rights of the received digital object with a digital rights management module.

13. A computer-implemented method comprising:
receiving, at an originating server comprising one or more hardware processors, a request to legitimately obtain a digital object;
receiving, at the originating server, a preference to place the legitimately obtained digital object in a personalized data store comprising a user-specific storage location associated with, and remote from, a user associated with the user request, the user being able to manipulate digital objects in the user-specific storage location associated with the user; and
transferring the digital object from the originating server to an intermediate storage location along with an instruction instructing the intermediate storage location to forward the digital object to the personalized data store located on a server different from the originating server and remote from the user, the server different from the originating server having a plurality of users and a plurality of user-specific storage locations corresponding to the plurality of users;
wherein the intermediate storage location is an electronic device under the control or direction of the user.

14. The computer-implemented method of claim 13, further comprising receiving the user preference from a downloader application.

15. The computer-implemented method of claim 13, wherein the originating server and personalized data store are administered by different entities.

16. The computer-implemented method of claim 13, wherein the user preference comprises a preconfigured placement setting, which is set prior to receiving the user request to legitimately obtain the digital object.

17. The computer-implemented method of claim 13, further comprising:
initiating installation of a downloader application on the intermediate storage location; and
directing with the installed downloader application to place digital objects present on the intermediate storage location in the personalized data store.

18. A computing device comprising:
one or more hardware processors;
one or more computer-readable storage media storing instructions that, when executed on the computing device, instruct the one or more hardware processors to perform acts comprising:
receiving, at the computing device under the control or direction of a user, a user preference to place at least one digital object that is subsequently obtained legitimately in a personalized data store comprising a user-specific storage location associated with, remote from, and at least remotely accessible over a wide area network by, the user;
sending a request to legitimately obtain a specified digital object from an originating server;
receiving, at the computing device, the specified digital object from the originating server, the receiving including storing the received specified digital object in a secured digital object storage module such that the user cannot access the received specified digital object; and
automatically placing, by the computing device, the received specified digital object in the personalized data store in response to the user preference and without further instruction from the user such that the received specified digital object is removed from the secured digital object storage module, the personalized data store being one of a plurality of personalized data stores, each of the plurality of personalized data stores associated with a corresponding user of a plurality of users, the plurality of personalized data stores each comprising a user-specific storage location of the corresponding user.

19. The computing device of claim 18, wherein the user preference comprises a preconfigured placement setting, which is set prior to sending the request to legitimately obtain the digital object.

20. The computing device of claim 18, the one or more computer-readable storage media further storing instructions to perform additional acts comprising:
installing a downloader application on the computing device, and
wherein the placing comprises transferring the digital object to the personalized data store using the downloader application.

21. The computing device of claim 20, wherein the downloader application comprises a digital rights management module configured to enforce digital rights of the digital object on the computing device and the secured digital object storage module is configured to store the digital object on the computing device.

22. The computing device of claim 21, wherein the secured digital object storage module is configured to encrypt the digital object and allow decryption on the computing device.

23. The computing device of claim 20, the one or more computer-readable storage media further storing instructions to perform additional acts comprising:
sending a request to the personalized data store to stream the digital object from the personalized data store to the computing device as long as the user retains access rights to the digital object; and
presenting the digital object streamed from the personalized data store.

24. The computing device of claim 18, the one or more computer-readable storage media further storing instructions to perform additional acts comprising:
enforcing digital rights of the received digital object with a digital rights management module.

* * * * *